United States Patent [19]

Sides et al.

[11] Patent Number: 5,890,736
[45] Date of Patent: Apr. 6, 1999

[54] ASPIRATION-TYPE AIR BAG INFLATION APPARATUS

[75] Inventors: James R. Sides; Phillip D. Fisher; Robert S. Scheffee, all of Gainesville, Va.

[73] Assignee: Atlantic Research Corporation, Gainesville, Pa.

[21] Appl. No.: 872,325

[22] Filed: Jun. 10, 1997

[51] Int. Cl.$^6$ .................................................. B60R 21/30
[52] U.S. Cl. .......................... 280/738; 280/736; 280/741; 280/742
[58] Field of Search .................................. 280/738, 741, 280/742, 736

[56] References Cited

U.S. PATENT DOCUMENTS

| | | | |
|---|---|---|---|
| 3,056,540 | 10/1962 | Marsh et al. ............................ | 280/738 |
| 3,791,669 | 2/1974 | Hamilton ................................. | 280/738 |
| 3,909,037 | 9/1975 | Stewart ................................... | 280/738 |

Primary Examiner—Eric D. Culbreth
Attorney, Agent, or Firm—Sixbey, Friedman, Leedom & Ferguson; Frank P. Presta; Joseph S. Presta

[57] ABSTRACT

Apparatus for inflating a vehicle air bag and for reducing the inflation rate of the air bag in the event that an occupant of the vehicle engages the air bag before it is fully inflated, including a gas generating unit for producing an inflation gas in response to a predetermined impact to the vehicle, and an aspiration unit operatively connected to the gas generating unit and to the air bag. The aspiration unit includes an ambient air inlet, a mixing chamber in communication with the air inlet, and one or more nozzles in communication with the gas generating unit and the mixing chamber for directing inflation gas into the mixing chamber to aspirate ambient air through the air inlet into the mixing chamber so that a mixture of ambient air and generated inflation gas is created for the inflation of the air bag. Upon engagement of the air bag by the vehicle occupant before it is fully inflated, a back pressure is created in the mixing chamber to reduce or terminate the flow of aspirated air and generated inflation gas into the mixing chamber and thus to reduce the inflation rate of the air bag, thereby preventing continued rapid inflation of the air bag and possible serious injury to the occupant.

13 Claims, 7 Drawing Sheets

ASPIRATION-TYPE AIR BAG INFLATION APPARATUS

BACKGROUND OF THE INVENTION

The present invention relates to an air bag inflation apparatus and, more particularly, to an aspiration-type air bag inflation apparatus which reduces the inflation rate of the air bag in the event that an occupant of a vehicle impacts the air bag before it is fully inflated.

In a typical automobile collision, air bag inflation is essentially completed at the time an occupant starting from a properly seated position moves forward and contacts the inflated air bag. In this instance, the occupant in moving forward contacts the bag surface at approximately the speed the vehicle had just prior to vehicle impact. The occupant moving into the bag is enveloped and brought to rest by the cushioning effect of the pressurized bag. However, an occupant who is not properly positioned sitting back in the seat, but instead is leaning forward or sitting forward or standing in front of the seat or in contact with the air bag module cover at the time of vehicle impact may interfere with the air bag during the inflation process. In this instance, the bag surface is developing and expanding rearwardly into the vehicle interior at a high velocity relative to the vehicle. The bag intercepts the occupant moving forward in the aforementioned manner producing a relative occupant-air bag surface impact velocity as high as 200 m.p.h. The partially inflating and expanding bag envelopes the occupant, bringing the occupant first to rest relative to the vehicle and then as the bag continues to pressurize, accelerates the portion of the occupant's body in contact with the bag rearward with substantial force, which may result in serious or fatal injury. A need has arisen, therefore, for an air bag inflation apparatus that will automatically mediate the inflation rate of the air bag to limit the pressure developed in the air bag to the level necessary for the safe protection of the occupant regardless of proximity to the air bag module in the vehicle at the time of vehicular impact.

SUMMARY OF THE INVENTION

The air bag inflation apparatus of the present invention draws air from the passenger compartment of the vehicle to augment the primary propellant gas flowing into the air bag during its inflation process. The air bag is inflated in this manner to its normal unrestricted volume. Since a properly positioned occupant contacts the air bag after it has reached full inflation, protection of the occupant is provided in a manner equivalent to that provided by air bag inflation devices currently in use. However, because of the pressure limited pumping capability intrinsic to the principles of operation of aspirating devices, principles that are embodied in this invention, an early encounter with the inflating air bag by an out-of-position occupant will cause the inflation apparatus to mediate the gas flow entering the air bag. The pressure in the bag, therefore, will not exceed the fully inflated air bag design pressure and will remain essentially constant at the design value during the remainder of the crash event, thereby preventing serious injury or the death of the out-of-position occupant, an outcome that may result from the continued pressurization of the air bag and the resultant thrusting of the occupant violently backward toward the rear of the vehicle.

This is accomplished by utilizing the momentum of a high velocity jet of propellant combustion products to entrain and draw in ambient air from the vehicle occupant compartment so that a mixture of aspirated air and combustion gas fills the air bag. As has been noted previously, the air bag will be fully inflated prior to being contacted by an occupant properly positioned prior to the vehicular crash impact. If, however, the occupant is in too close proximity to the air bag module at the time of the crash, the occupant will interfere with the air bag as it is being deployed and encounter the air bag before it is fully inflated. The air bag is prevented from expanding to its full volume and the pressure in the restricted air bag will increase prematurely approaching the design final inflation pressure. The air bag inflation apparatus of this invention will mediate gas flow into the air bag by reducing or terminating aspiration in response to early increased bag pressure, thereby preventing the serious injury that may result to the improperly positioned occupant from over-pressurization of the deploying air bag.

The air inlets for the aspirated air may be provided with check valves to prevent backflow of the propellant combustion products therethrough, resulting in a reduced flow into the air bag of only the unaspirated combustion products. Alternatively, flow into the air bag can be terminated completely if the air inlets do not have check valves, thereby resulting in backflow of the propellant combustion gases through the air inlets.

DESCRIPTION OF THE PREFERRED EMBODIMENTS

Figure 1:
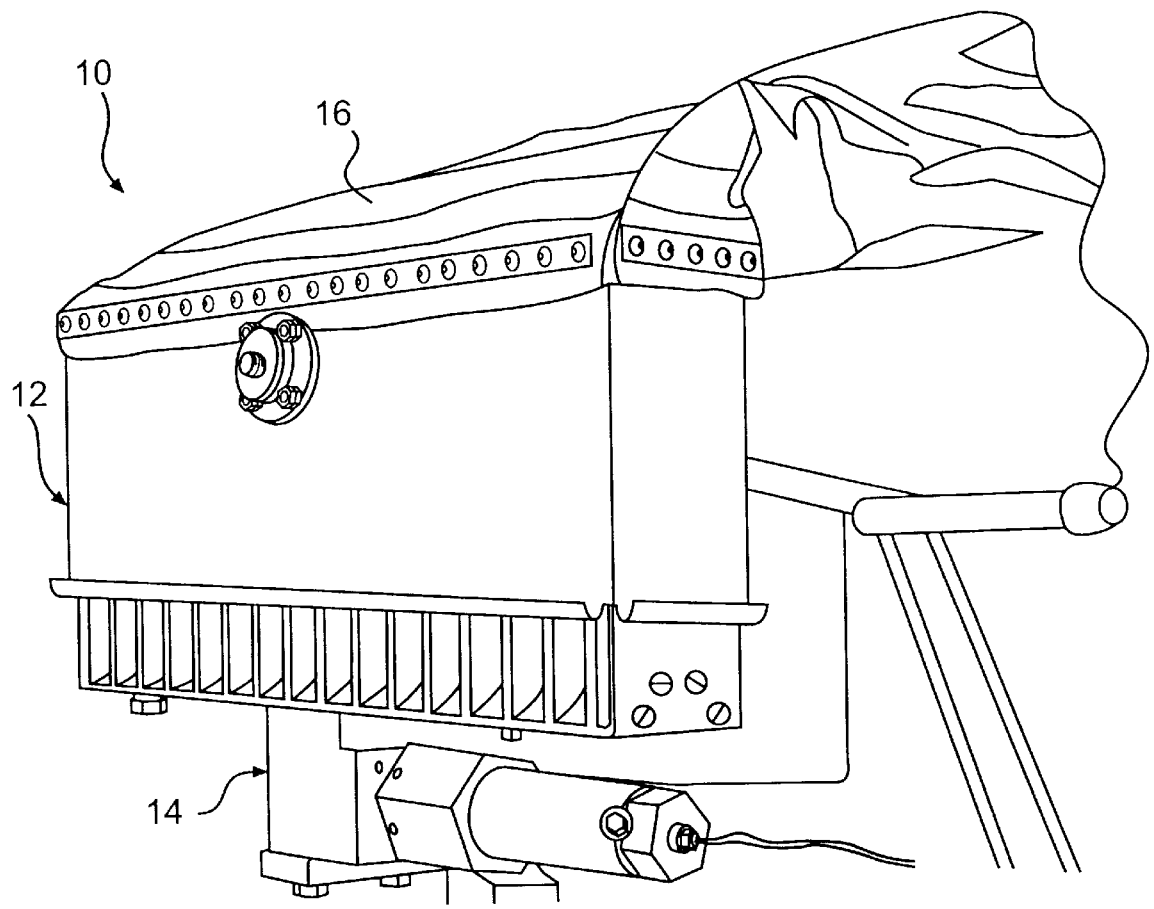
FIG. 1 is a perspective view of a first embodiment of the air bag inflation apparatus of the present invention after deployment of the air bag.

Referring to FIG. 1, the air bag inflation apparatus 10 of the present invention generally comprises an aspiration unit 12, a gas generating unit 14 connected to one end of the aspiration unit, and an inflatable air bag 16 connected to the other end of the aspiration unit. The gas generating unit 14 may be of any suitable construction and preferably comprises a solid propellant charge (not shown) of any suitable composition that is ignitable upon a predetermined vehicle impact in a manner well known to those skilled in the art. Alternatively, the gas generating unit may comprise a compressed inert gas alone or in combination with a propellant in a hybrid construction. Similarly, the air bag 16 may be of any suitable construction and formed of any suitable material. The aspiration unit 12 is shown in an open position wherein the air bag 16 is deployed in a manner that will be more fully explained hereinafter. Before deployment, the air bag 16 may be stored inside or outside of the aspiration unit 12.

Figure 2:
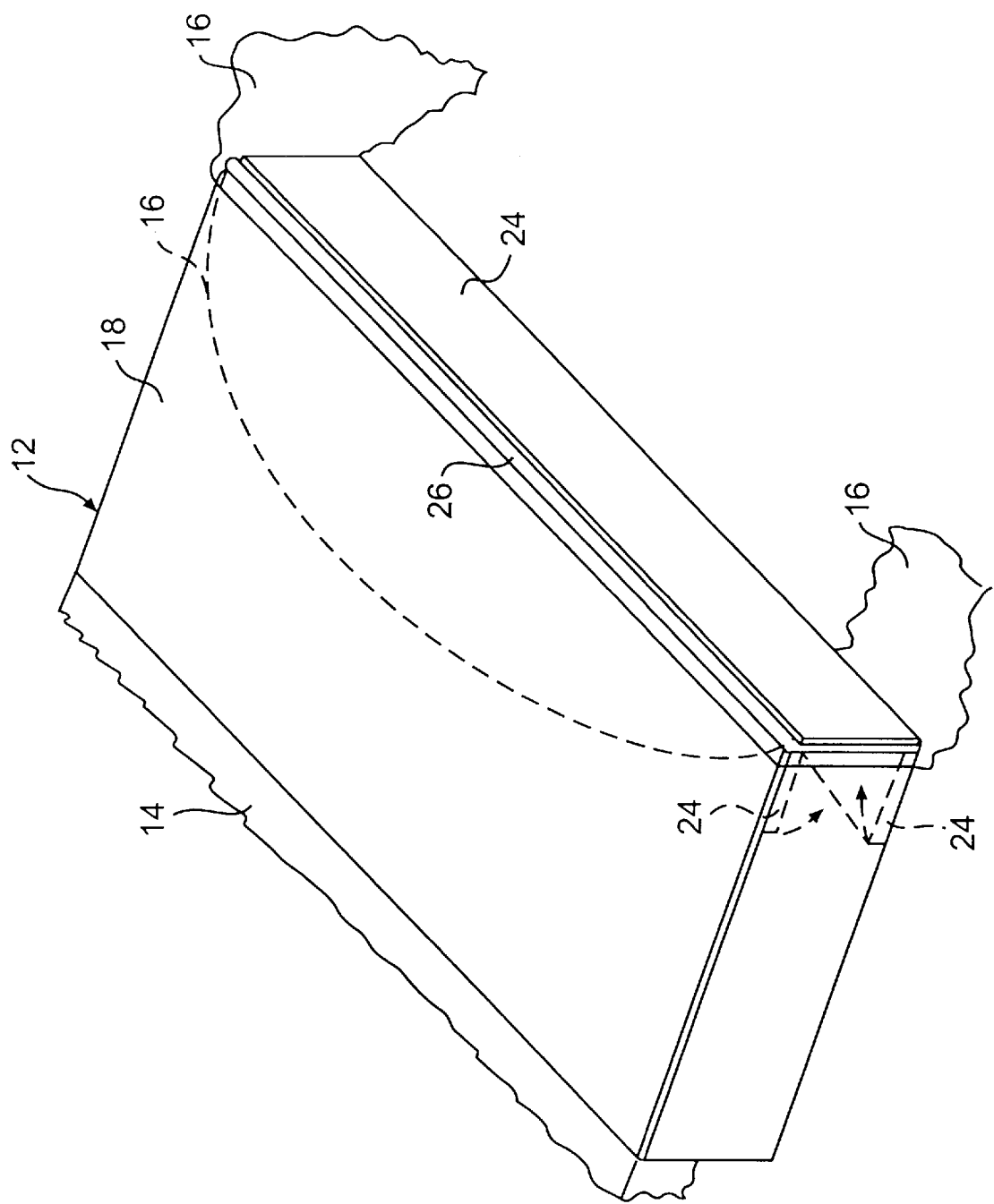
FIG. 2 is a perspective view of a portion of the air bag inflation apparatus shown in FIG. 1 in a closed position prior to inflation of the air bag.

A first embodiment of the aspiration unit 12 is shown in FIGS. 2–5. In FIG. 2, the aspiration unit 12 is shown in a closed position wherein the air bag 16 may be stored within the unit or on the exterior thereof. The storage position of the air bag will depend on the construction of the aspiration unit 12 and the space available in the vehicle for the air bag inflation apparatus 10.

The aspiration unit 12 preferably comprises a pair of slidably connected, telescoping sections 18 and 20. The outer section 18 is movable between the closed position shown in FIG. 2, wherein it covers the inner section 20, and the open position shown in FIG. 3, wherein it exposes a plurality of air inlets 22 in the inner section. The opposite or outer end of the outer section 18 comprises a pair of diffuser flaps 24 which, in one embodiment, are biased in any suitable manner to the closed position shown in FIG. 2 wherein they overlap each other by any suitable hinge means 26 or the like. In this embodiment, the air bag 16 is stored on the outside of the aspiration unit as shown in solid lines in FIG. 2.

In another embodiment, the diffuser flaps 24 may be stored internally of the aspiration unit as shown in broken lines in FIG. 2, wherein the diffuser flaps would be biased inwardly and would each be of a width approximately one-half the height of the aspiration unit at the outer end thereof. In this embodiment, the air bag 16 is stored inside of the aspiration unit as shown in broken lines in FIG. 2.

Figure 3:
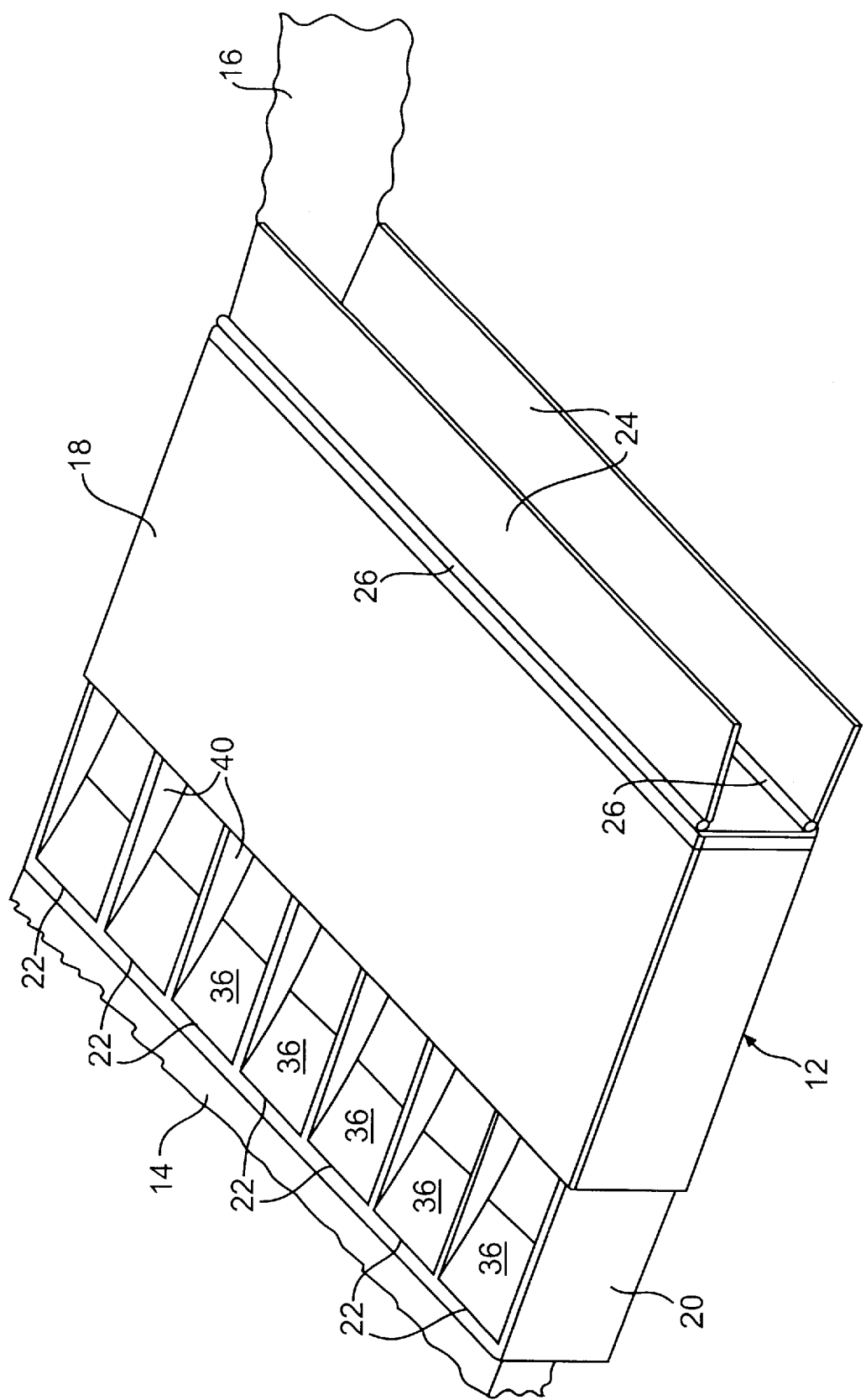
FIG. 3 is a perspective view of the apparatus shown in FIG. 2 in an open position during and after inflation of the air bag.
Figure 4:
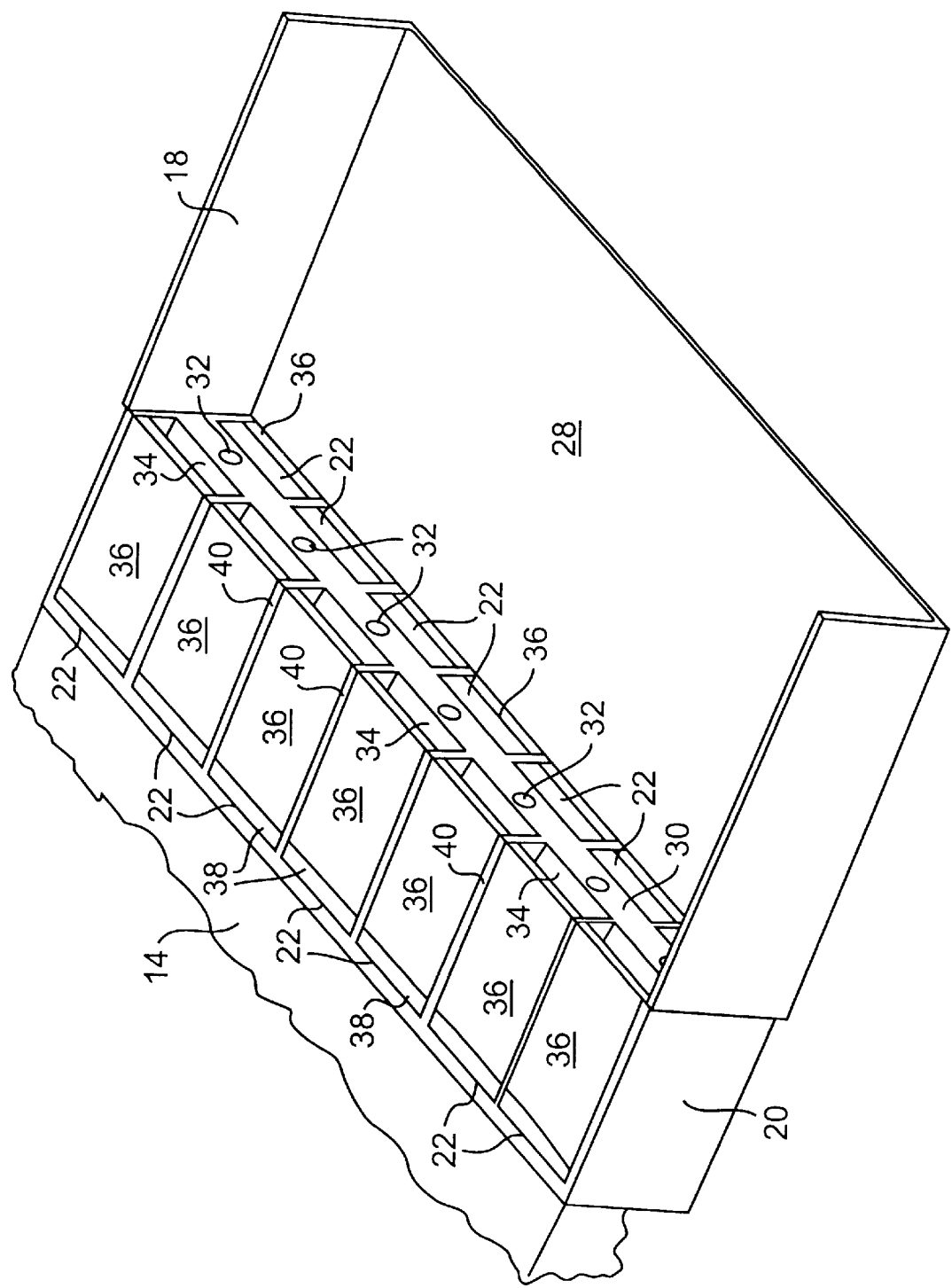
FIG. 4 is a perspective view of the apparatus shown in FIG. 3, with parts broken away.

As shown in FIG. 4, the outer aspiration section 18 defines a mixing chamber 28, and the inner aspiration section 20 comprises a plurality of air inlets 22 on the upper and lower sides thereof which are separated by a wall 30 comprising a plurality of motive gas nozzles 32 that are in communication with the gas generating unit 14. Each of the air inlets 22 may be opened or closed to air flow by a flap valve 36 or other suitable valve means that is biased by suitable hinge means 38 or the like to the closed position shown in FIG. 4 wherein it closes the air inlet, and is movable to the open position shown in FIG. 3 in a manner to be more fully explained hereinafter. The air inlets 22 are separated by partitions 40 extending upwardly and downwardly from the wall 30.

In one embodiment, each of the air inlets 22 has an inwardly inclined surface 34 which the flap valve 36 engages when in the open position of FIG. 3. In another embodiment, instead of the inwardly inclined surface 34, the flap valve 36 is formed with a suitably curved shape to provide the inclined air inlet surface when in the open position.

Figure 5:
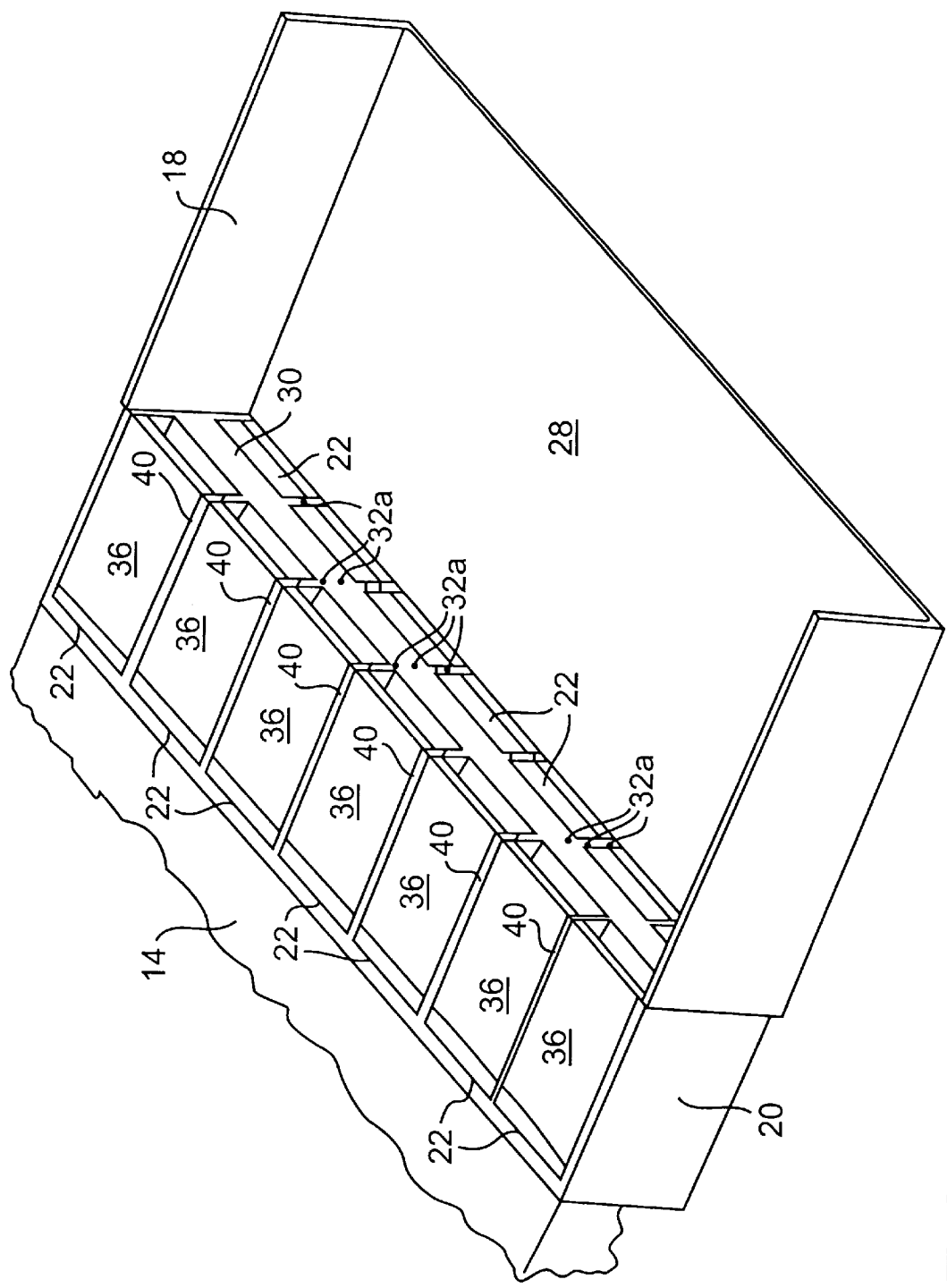
FIG. 5 is a perspective view similar to that of that FIG. 4, showing a modified arrangement of the combustion gas nozzles.

An alternate embodiment of the aspiration unit 12 is shown in FIG. 5 wherein a larger number of smaller motive gas nozzles 32a are provided in aligned relation along the inner end surfaces of the partitions 40. The nozzles 32a are in communication with the gas generating unit 14. The number, size and arrangement of the motive gas nozzles 32 and 32a will determine the size of the mixing section 28 of the outer aspirator section 18 in accordance with principles well known to those skilled in the art.

In the operation of the air bag inflation apparatus 10 of the present invention, when the apparatus is in an inactive state in the vehicle with the air bag stored inside or outside of the outer aspiration section 18, the outer aspiration section 18 covers the inner section 20 and closes the air inlets 22, as shown in FIG. 2. In this position, the diffuser flaps 24 are folded closed as shown in the embodiment in solid lines in FIG. 2. The air bag 16 is externally attached to the aspiration unit 12 as shown in FIG. 1. The air bag is then folded and secured in place against the diffuser flaps in accordance with methods known to those skilled in the art. In the second embodiment shown in broken lines in FIG. 2, the diffuser flaps 24 and air bag 16, are stored inside of the aspiration unit 12 in the outer section 18 thereof.

Upon a predetermined impact to the vehicle, the gas generating unit 14 is actuated to generate gases that are directed into the mixing section 28 of the outer aspiration section 18 through the motive gas nozzles 32 or 32a. The build-up of motive gas pressure in the mixing section 28 opens the diffuser flaps 24, unfolds the air bag 16, and causes the outer aspiration section to move to the open position shown in FIG. 3 wherein it exposes the air inlets 22 in the inner aspiration section 20 and creates a pressure difference which opens the flap valves 36 and allows ambient air to be aspirated through the air inlets 22 into the mixing chamber 28 of the movable aspiration section 18. During the initial flow of motive gas into the mixing chamber 28, the flap valves 36 are in the closed position shown in FIG. 4 to prevent the motive gas from flowing backwardly out through the air inlets 22.

The pressure build-up in the mixing chamber 28 of the outer aspiration section 18 caused by the generated motive gas and the aspirated air inflates the air bag 16 in the manner shown in FIG. 1. Suitable stop means (not shown) are provided to limit the movement of the outer aspiration section 18 relative to the inner section 20. Also, the movement of the diffuser flaps 24 to the open position shown in FIG. 3 is limited by the hinge means 26 or any other suitable stop means so that the diffuser flaps are at a desired angle in accordance with principles well known to those skilled in the art.

The diffuser flaps 24 are opened either mechanically by tethers (not shown) attached to the air bag 16 or pneumatically by the gases from the gas generator 14. They are retained at the correct half-angle by the interior gas pressure. Either the air bag or the mounting hardware in the vehicle serve as partitions on each side of the diffuser flaps, ensuring only axial flow therethrough.

In the normal operation of the air bag inflation apparatus 10, the air bag 16 would be fully inflated before the occupant engages it. If an occupant is out of position, however, and engages the air bag 16 before it is fully inflated, a back pressure will be created by the restricted air bag in the mixing chamber 28 which will prevent aspiration as the back pressure increases, the flap valves 36 will close and prevent backflow of the generated motive gas, thus reducing the inflation rate of the air bag and preventing serious injury to the occupant. Because the bag pressure rises to exceed the pumping pressure limit of the aspirator, the flap valves 36 are closed preventing back flow of the propellant gases out of the air inlets 22 and allowing the same to continue filling the air bag at the reduced inflation rate.

Alternately, the flap valves 36 or other types of check valves may be omitted from the air inlets, in which event the back pressure created by the engagement of an out-of-position occupant with the partially inflated air bag may cause a reverse flow from the mixing chamber through the air inlets 22 to stop all further inflation of the air bag and prevent serious injury to the occupant.

If the flap valves 36 or other check valves are omitted from the air inlets 22, the motive gas nozzles and the mixing chamber would be constructed in accordance with principles well known to those skilled in the art to ensure that motive gas created by the gas generating unit 14 would create sufficient pressure in the mixing chamber 28 to move the outer aspiration section 18 to the open position without significant backflow of the motive gas through the air inlets 22.

Figure 6:
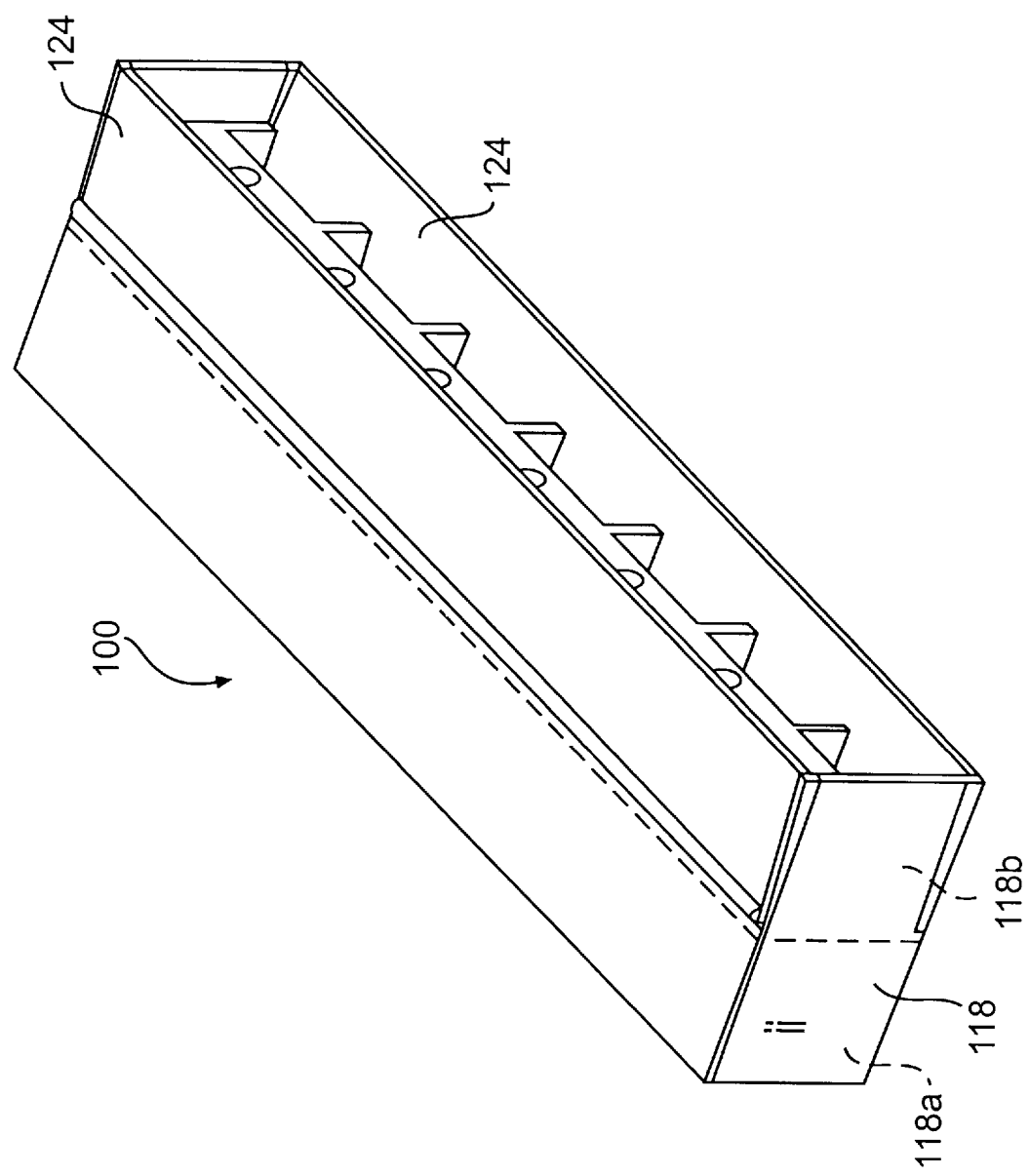
FIG. 6 is a perspective view of a second embodiment of the air bag inflation apparatus of the present invention, showing a modified aspiration, mixing and diffuser unit in a closed position prior to inflation of the air bag.
Figure 7:
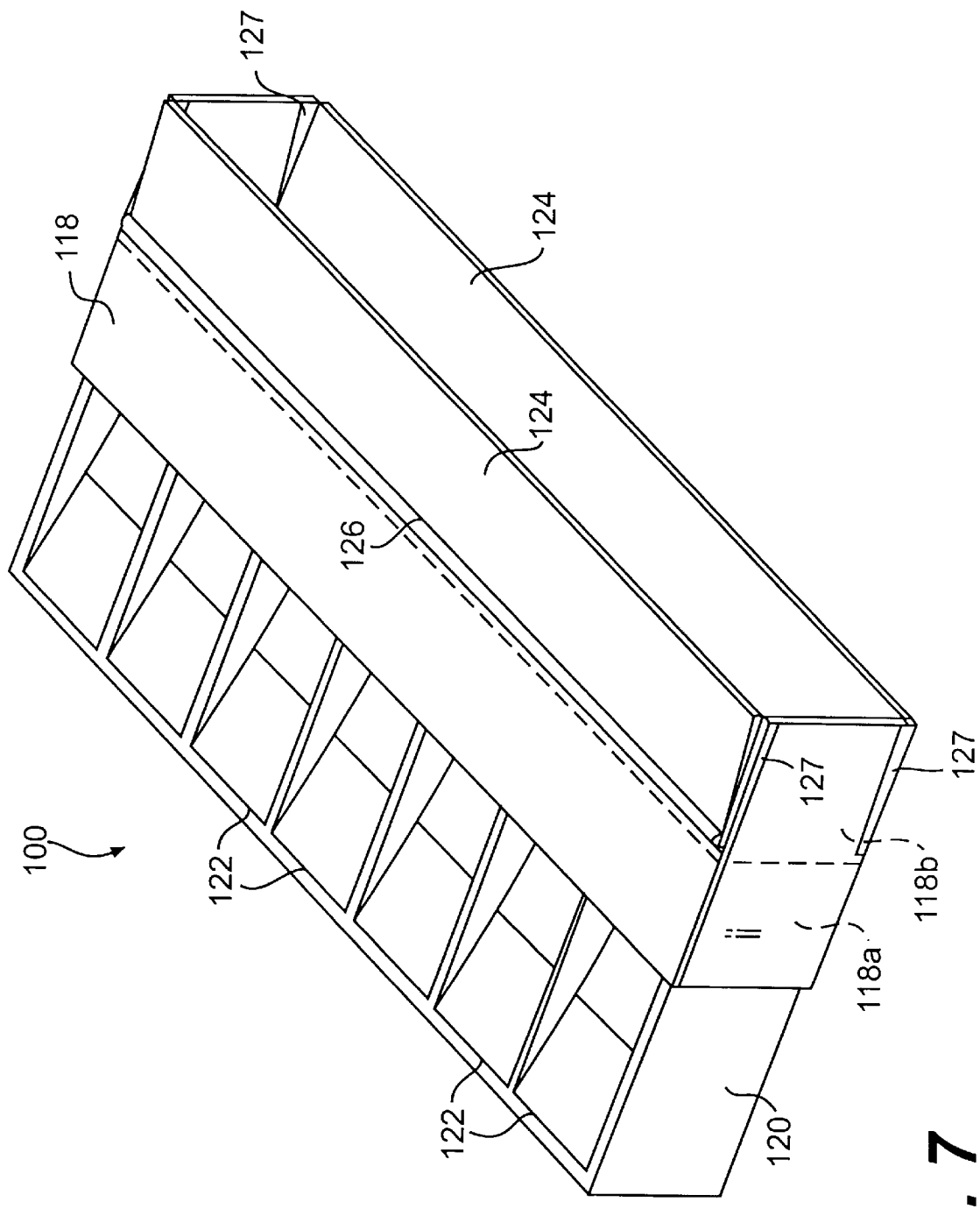
FIG. 7 is a perspective view of the apparatus shown in FIG. 6 in an open position during and after inflation of the air bag.

FIGS. 6 and 7 illustrate a further embodiment of the present invention wherein the aspiration unit 100 comprises a pair of telescoping sections 118 and 120, the outer section 118 being movable from the closed position shown in FIG. 6 to the open position shown in FIG. 7 wherein it exposes the air inlets 122 in the inner section 120. The construction of the inner aspiration section 120 is essentially the same as that of the inner aspiration section 20 shown in FIGS. 3–5.

The construction of the outer, movable aspiration section 118 differs from the aspiration section 18 shown in FIGS. 2 and 3 in that it does not comprise the diffuser flaps 24 that are normally closed. Instead, the outer aspiration section 118 comprises diffuser flaps 124 that are open in both the open and closed position of the outer aspiration section, and is provided with partitions on each side of the diffuser flaps to ensure axial flow. In one embodiment, the diffuser flaps 124 are fixed at the desired angle for proper inflation of the air bag. In another embodiment, for the purpose of limiting the storage height of the aspiration unit, the diffuser flaps 124 are movable between a first position shown in FIG. 6 wherein they are disposed in substantially the same plane as the adjacent upper and lower surfaces of the aspiration section 118 and are movable to a second position shown in FIG. 7 through an appropriate hinge means 126 or the like to the desired angle when the aspiration section 118 is moved to the open position shown in FIG. 7 during inflation of the air bag. To prevent leakage of the air and gas mixture inflating the air bag, the aspiration unit 118 may be provided with slidable side wall sections 127 that are secured to the diffuser flaps 124 and move outwardly therewith, as shown in FIG. 7.

In a further embodiment of the present invention, for the purpose of conserving space when in a closed position, the outer, movable aspirator section 118 could be formed of two telescoping sections, a mixing section 118a and a diffuser section 118b that is slidable over the mixing section 118a in telescoping relation therewith. This embodiment is shown schematically in broken lines in FIGS. 6 and 7.

Although some preferred embodiments of the invention have been described above by way of example only, it will be understood by those skilled in the art that modifications may be made to the disclosed embodiments without departing from the scope of the invention, which is defined by the appended claims.

What is claimed is:

1. Apparatus for inflating a vehicle air bag and for reducing the inflation rate of the air bag in the event an occupant of the vehicle engages the air bag before it is fully inflated, comprising:

gas generating means for producing an inflation gas in response to a predetermined impact to the vehicle, aspiration means operatively connected to said gas generating means and to the air bag, said aspiration means comprising an ambient air inlet, a mixing chamber in communication with said air inlet, and nozzle means in communication with said gas generating means and said mixing chamber for directing inflation gas into said mixing chamber to aspirate ambient air through said air inlet into said mixing chamber so that a mixture of ambient air and generated inflation gas is created to inflate the air bag, and further wherein said aspiration means comprises an inner section and an outer section in telescoping relation with said inner section, said inner section being in communication with said gas generating means and including said ambient air inlet and said nozzle means, and said outer section including said mixing chamber and being in communication with the air bag, said outer section being movable by pressure from said inflation gas in said mixing chamber from a closed position wherein said outer section covers the ambient air inlet in said inner section to an open position wherein said outer section exposes the ambient air inlet in said inner section, whereby upon engagement of the air bag by a vehicle occupant before it is fully inflated, a back pressure is created in said mixing chamber to reduce the flow of aspirated air into said mixing chamber and reduce the inflation rate of the air bag, thereby preventing continued rapid inflation of the air bag and possible serious injury to the occupant.

2. The apparatus of claim 1 wherein said aspiration means has one end in communication with said gas generating means and another end in communication with the air bag.

3. The apparatus of claim 1 wherein said aspiration means comprises a plurality of ambient air inlets and said nozzle means comprises a plurality of nozzles.

4. The apparatus of claim 1 wherein said air inlet comprises check valve means which is operable to normally close said air inlet and to be opened upon the aspiration of air through said air inlet, said check valve means being operable to close said air inlet upon the creation of a back pressure in said mixing chamber.

5. The apparatus of claim 4 wherein said air inlet has a surface that is inclined inwardly toward said mixing chamber, and said check valve means comprises a flap valve hingedly mounted on said inclined surface.

6. The apparatus of claim 4 wherein said check valve means comprises a flap valve hingedly mounted in said air inlet.

7. The apparatus of claim 1 wherein said aspiration means comprises diffuser means disposed adjacent said air bag to increase the pressure of the mixture of aspirated air and generated inflation gas to the pressure required to inflate the air bag.

8. The apparatus of claim 7 wherein said diffuser means comprises a pair of diffuser flaps that are normally biased to a closed position to interrupt communication between said mixing chamber and the air bag, said diffuser flaps being movable to an open position upon a buildup of inflation gas and ambient air pressure in said mixing chamber.

9. The apparatus of claim 8 wherein said diffuser flaps are connected to the air bag.

10. The apparatus of claim 7 wherein said diffuser means comprises a pair of diffuser flaps that are normally biased to an inoperative position disposed inside said mixing chamber and are movable to an open position outside of said mixing chamber upon a buildup of inflation gas and ambient air pressure therein.

11. The apparatus of claim 10 wherein said diffuser flaps are connected to the air bag.

12. The apparatus of claim 1 wherein said inner section comprises a plurality of air inlets disposed on opposite sides thereof, said air inlets being separated by wall means having said nozzle means disposed therein.

13. The apparatus of claim 12 wherein said inner aspiration section further comprises partition means separating said air inlets and having said nozzle means therein.

* * * * *